United States Patent
Jeong et al.

(10) Patent No.: US 8,811,990 B2
(45) Date of Patent: Aug. 19, 2014

(54) METHOD AND APPARATUS FOR PERFORMING MEASUREMENT ON NEIGHBORING CELLS IN A MOBILE COMMUNICATION SYSTEM

(75) Inventors: Kyeong-In Jeong, Hwaseong-si (KR); Soeng-Hun Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 998 days.

(21) Appl. No.: 12/663,963

(22) PCT Filed: Jun. 18, 2008

(86) PCT No.: PCT/KR2008/003460
§ 371 (c)(1),
(2), (4) Date: Dec. 10, 2009

(87) PCT Pub. No.: WO2008/156304
PCT Pub. Date: Dec. 24, 2008

(65) Prior Publication Data
US 2010/0184434 A1 Jul. 22, 2010

(30) Foreign Application Priority Data
Jun. 18, 2007 (KR) .......................... 10-2007-0059648

(51) Int. Cl.
*H04W 4/00* (2009.01)
(52) U.S. Cl.
USPC ..................... 455/435.2; 455/434; 455/67.11; 455/425
(58) Field of Classification Search
USPC ........ 455/435.2, 525, 436, 434, 67.11–67.16, 455/423–425
See application file for complete search history.

(56) References Cited

U.S. PATENT DOCUMENTS

| | | | |
|---|---|---|---|
| 6,507,740 B2 | 1/2003 | Shi | |
| 6,751,460 B2 | 6/2004 | Korpela et al. | |
| 7,676,226 B2* | 3/2010 | Han et al. | 455/436 |
| 7,907,947 B2 | 3/2011 | Ida et al. | |
| 7,941,148 B2* | 5/2011 | Roskowski et al. | 455/436 |
| 8,023,468 B2* | 9/2011 | Liu et al. | 370/331 |
| 2001/0031638 A1* | 10/2001 | Korpela et al. | 455/449 |
| 2003/0040311 A1* | 2/2003 | Choi | 455/434 |
| 2005/0032542 A1* | 2/2005 | Wilborn et al. | 455/525 |
| 2005/0042987 A1* | 2/2005 | Lee et al. | 455/67.11 |
| 2008/0227453 A1* | 9/2008 | Somasundaram et al. | 455/436 |
| 2009/0042577 A1* | 2/2009 | Tolli et al. | 455/436 |
| 2009/0047958 A1* | 2/2009 | Rimhagen et al. | 455/436 |
| 2009/0061871 A1* | 3/2009 | Gross et al. | 455/436 |
| 2009/0088160 A1* | 4/2009 | Pani et al. | 455/436 |

FOREIGN PATENT DOCUMENTS

| | | |
|---|---|---|
| JP | 3-104328 | 5/1991 |
| JP | 4-117822 | 4/1992 |
| JP | 2006-352822 | 12/2006 |

* cited by examiner

*Primary Examiner* — Sharad Rampuria
*Assistant Examiner* — Sayed T Zewari
(74) *Attorney, Agent, or Firm* — The Farrell Law Firm, P.C.

(57) ABSTRACT

A method for performing measurement on neighboring cells in a mobile communication system is provided. The method measurement method includes generating raw measurement result values by performing measurement on received signals from neighboring cells; receiving measurement-related parameters to be applied to neighboring cells having raw measurement result values exceeding an absolute threshold signaled from a base station as a result of the measurement, among the neighboring cells; generating final measurement result values by applying the measurement-related parameters to the raw measurement result values of the first neighboring cells; and performing cell selection or cell reselection to one of the first neighboring cells according to the final measurement result values, or transmitting a measurement report to a base station of a serving cell.

20 Claims, 11 Drawing Sheets

METHOD AND APPARATUS FOR PERFORMING MEASUREMENT ON NEIGHBORING CELLS IN A MOBILE COMMUNICATION SYSTEM

BACKGROUND OF THE INVENTION

1. Field of the Invention

The present invention relates generally to a mobile communication system, and in particular, to a method and apparatus for performing measurement on neighboring cells for cell selection or cell reselection and handover.

2. Description of the Related Art

The Universal Mobile Telecommunication Service (UMTS) system is a $3^{rd}$ generation asynchronous mobile communication system that uses Wideband Code Division Multiple Access (W-CDMA) and is based on Global System for Mobile communications (GSM) and General Packet Radio Services (GPRS), both of which are European mobile communication systems. In $3^{rd}$ Generation Partnership Project (3GPP) in charge of UMTS standardization, a Long Term Evolution (LTE) system is now under discussion as the next generation mobile communication system of the UMTS system. LTE is a technology for implementing high-speed packet-based communication having a transfer rate of a maximum of 100 Mbps, aimed at its commercialization in around 2010. To this end, several schemes are under discussion, and they include, for example, a scheme of reducing the number of nodes situated in the communication path by simplifying a configuration of the network, and another scheme of maximally approximating wireless protocols to wireless channels.

FIG. 1 illustrates an exemplary configuration of an Evolved UMTS mobile communication system.

Referring to FIG. 1, an Evolved UMTS Radio Access Network (E-UTRAN or E-RAN) 110 is simplified to a 2-node configuration of evolved Node Bs (eNBs) 120, 122, 124, 126 and 128, and anchor nodes 130 and 132. A User Equipment (UE) 101, also known as a terminal, accesses the Internet Protocol (IP) network by means of E-RANs 110 and 112. The eNBs 120 to 128, which correspond to the legacy Node Bs of the UMTS system, are connected to the UE 101 over wireless channels.

Compared with the legacy Node Bs, the eNBs 120 to 128 perform a complex function. In LTE, since all user traffics, including real-time services such as Voice over IP (VoIP), are serviced through a shared channel, there is a need for a device for gathering status information of UEs to perform scheduling, and the eNBs 120 to 128 serve as the device. Generally, one eNB controls a plurality of cells. In addition, the eNB performs Adaptive Modulation & Coding (AMC) that adaptively determines a modulation scheme and a channel coding rate according to the channel status of UEs.

Like in High Speed Downlink Packet Access (HSDPA), High Speed Uplink Packet Access (HSUPA) and/or Enhanced Dedicated Channel (E-DCH) services of UMTS, Hybrid Automatic Repeat reQuest (HARQ) is performed between the eNBs 120 to 128 and the UE 101 even in LTE, and since various Quality-of-Service (QoS) requirements cannot be satisfied only with HARQ, outer ARQ in an upper layer can be performed between the UE 101 and the eNBs 120 to 128. HARQ, a technique for soft-combining the previously received data with its retransmitted data without discarding the previously received data to increase a reception success rate, is used for increasing transmission efficiency in high-speed packet communication such as HSDPA and EDCH services. To implement the transfer rate of a maximum of 100 Mbps, LTE is expected to use Orthogonal Frequency Division Multiplexing (OFDM) as a wireless access technology in a 20-MHz bandwidth.

In such next generation mobile communication systems, there is a need for a measurement scheme for neighboring cells for cell selection or cell reselection and handover.

SUMMARY OF THE INVENTION

An aspect of the present invention is to address at least the problems and/or disadvantages and to provide at least the advantages described below. Accordingly, an aspect of the present invention is to provide a method and apparatus for reducing a measurement delay in performing measurement on neighboring cells for cell selection or cell reselection and handover.

Another aspect of the present invention is to provide a method and apparatus for reducing a measurement delay without increasing complexity of a UE.

According to one aspect of the present invention, there is provided a method for performing measurement on neighboring cells in a mobile communication system. The measurement method includes generating raw measurement result values by performing measurement on received signals from neighboring cells; receiving measurement-related parameters to be applied to raw measurement result values of first neighboring cells, from the first neighboring cells having raw measurement result values exceeding an absolute threshold signaled from a base station as a result of the measurement, among the neighboring cells; generating final measurement result values by applying the measurement-related parameters to the raw measurement result values of the first neighboring cells; and performing cell selection or cell reselection to one of the first neighboring cells according to the final measurement result values, or transmitting a measurement report to a base station of a serving cell.

According to another aspect of the present invention, there is provided an apparatus for performing measurement on neighboring cells in a mobile communication system. The measurement apparatus includes a neighboring cell maintenance unit for generating raw measurement result values by performing measurement on received signals from neighboring cells; a threshold manager for receiving measurement-related parameters to be applied to raw measurement result values of first neighboring cells, from the first neighboring cells having raw measurement result values exceeding an absolute threshold signaled from a base station as a result of the measurement, among the neighboring cells; a measurement unit for generating final measurement result values by applying the measurement-related parameters to the raw measurement result values of the first neighboring cells; a cell selection decision unit for performing cell selection or cell reselection to one of the first neighboring cells according to the final measurement result values; and a measurement report unit for transmitting a measurement report to a base station of a serving cell.

According to further another aspect of the present invention, there is provided a method for managing neighboring cells in a mobile communication system. The cell management method includes managing raw measurement result values for the neighboring cells; setting an absolute threshold or one of maximum and minimum offset values taking the raw measurement result values into consideration; and generating a message having system information including the set absolute threshold or one of the set maximum and minimum offset values, or generating a terminal-dedicated measurement control message.

According to yet another aspect of the present invention, there is provided an apparatus for managing neighboring cells in a mobile communication system. The cell management apparatus includes a neighboring cell maintenance unit for managing raw measurement result values for the neighboring cells; a threshold setting unit for setting an absolute threshold or one of maximum and minimum offset values taking the raw measurement result values into consideration; and a message generation unit for generating a message having system information including the set absolute threshold or one of the set maximum and minimum offset values, or generating a terminal-dedicated measurement control message.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for clarity and conciseness. Terms used herein are defined based on functions in the present invention and may vary according to users, operators' intention or usual practices. Therefore, the definition of the terms should be made based on contents throughout the specification.

Although a description of the present invention will be given herein with reference to the 3GPP LTE system evolved from the 3GPP UMTS system, by way of example, the same can be applied even to other mobile communication systems without separate modification.

According to the present invention, a UE receives measurement-related parameters through a Primary Broadcast Channel (P-BCH) and applies them to the measurement, only for the neighboring cells having a good radio channel whose radio strength exceeds a particular threshold among the detected neighboring cells. Otherwise, the UE receives measurement-related parameters through the P-BCH and applies them to the measurement, only for the neighboring cell having the best radio channel and the neighboring cells whose radio strength falls within a range of a particular threshold from that of the neighboring cell having the best radio channel as a result of the measurement on parameters except for the measurement-related parameters transmitted through the P-BCH. In this way, the UE receives P-BCH signals only for the available neighboring cells, instead of receiving P-BCH signals of the detected neighboring cells. In this case, the UE preferentially receives measurement-related parameters through the P-BCH and applies them to the measurement on the neighboring cell having the best radio channel as a result of the measurement on parameters except for the measurement-related parameters transmitted through the P-BCH, and then receives measurement-related parameters through the P-BCH and applies them to the measurement on the corresponding neighboring cells, only for the neighboring cells having the measurement result values within a range of a particular threshold compared with the measurement result value to which the measurement-related parameters are applied. Herein, the thresholds can be transmitted from an eNB (also known as base station) to the UE through system information or a UE-dedicated measurement control message, or can be hard-coded to the LIE as a single value.

Figure 1:
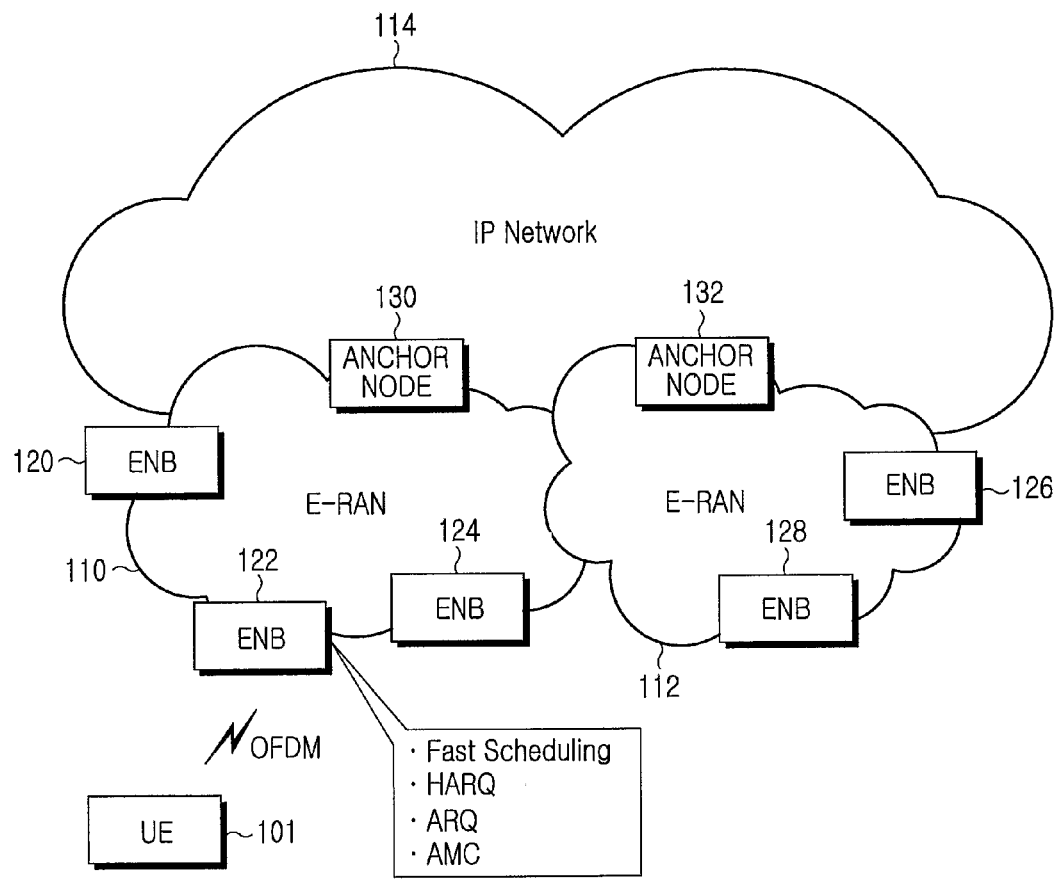
FIG. 1 is a diagram illustrating an exemplary configuration of an Evolved UMTS mobile communication system.
Figure 2:
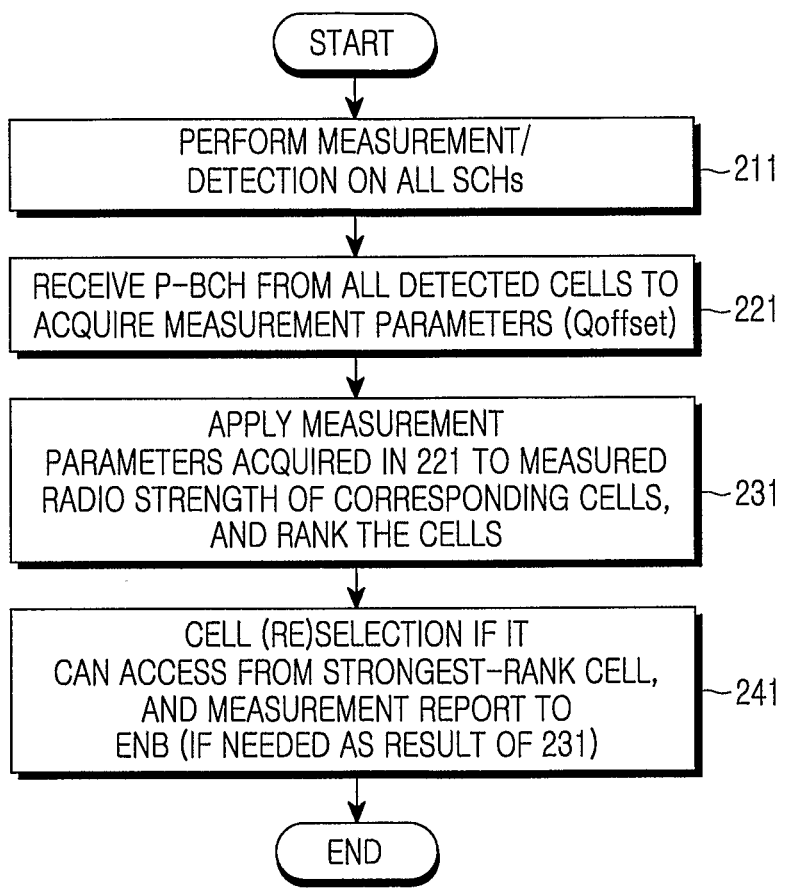
FIG. 2 is a follow diagram schematically illustrating a measurement operation on neighboring cells for cell (re)selection and handover in a mobile communication system.

FIG. 2 is a follow diagram schematically illustrating a measurement operation on neighboring cells for cell (re)selection and handover in a next generation mobile communication system to which the present invention is applied.

Referring to FIG. 2, in step 211, a UE performs measurement/detection on all Sync Channel (SCH) signals for cell identification. That is, the UE detects whether there are any cells in its vicinity. In step 221, the UE receives P-BCH signals through P-BCH for all detected neighboring cells, and receives a measurement-related parameter for each cell from the P-BCH signals. In step 231, the UE applies the measurement-related parameters to measurement result values for radio channel statuses of the corresponding neighboring cells, to assign ranks (or priorities) to the detected neighboring cells, thereby performing ranking (or prioritization). In step 241, the UE performs cell selection or cell reselection to the corresponding cell if it can access cells beginning from the highest-rank cell. In this case, a measurement report can be transmitted to an eNB if needed according to the status of the UE. For example, a Radio Resource Control (RRC) idle mode UE (i.e., DE in an RRC idle mode) performs cell reselection, and an RRC connected mode DE (i.e., UE in an RRC connected mode) performs measurement report when necessary.

The term 'measurement-related parameter' as used herein refers to a value which is reflected in measurement on a corresponding neighboring cell to complete a measurement procedure for each neighboring cell, and its example includes Qoffset. For the Qoffset, different values can be set between cells for the purpose of correction on a load balance between cells, and on a difference between uplink and downlink channel statuses, and they are applied to the measurement and used as correction values for the measurement result values for radio channel statuses. For example, even though a measurement result value for a radio channel of a cell A is better than that of a cell B, if Qoffset of the cell B is greater (or less) than Qoffset of the cell A in a difference between the measurement result values, the cell B has a higher rank than the cell A, for cell (re)selection. Qoffset follows a definition given in the 3GPP standard 25.331, 25.304.

In the typical mobile communication system operating as stated above, the UE should receive P-BCH signals for all detected neighboring cells to perform measurement on neighboring cells, increasing a delay for the measurement. In order to decrease the delay, the number of P-BCH signals of the neighboring cells that the UE should simultaneously receive increases, causing an increase in complexity of the DE.

In this context, the present invention proposes a scheme for decreasing a delay for the measurement. Further, the present invention proposes a scheme for performing measurement without increasing the complexity of the UE.

First Embodiment

Figure 3:
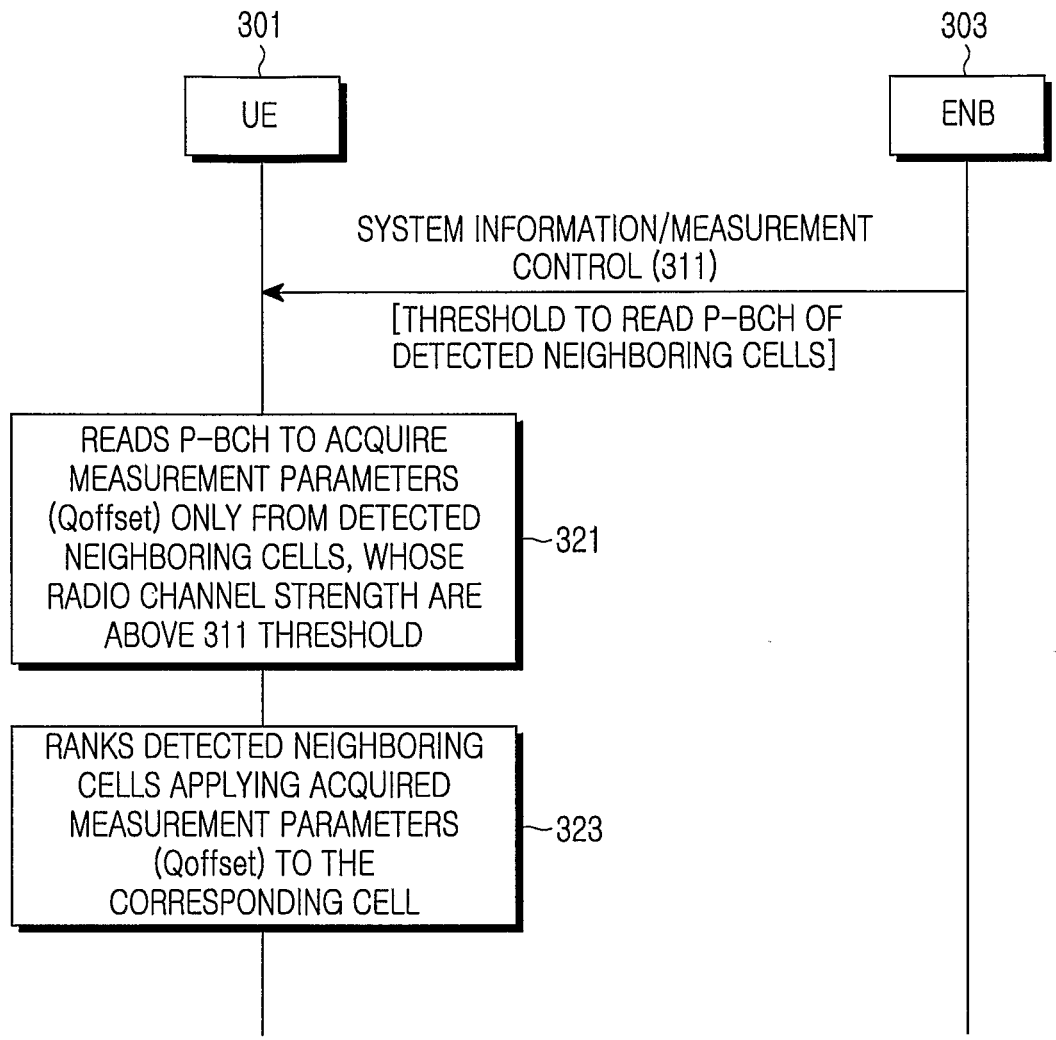
FIG. 3 is a message flow diagram illustrating a measurement operation on neighboring cells for cell (re)selection and handover according to a first embodiment of the present invention.

FIG. 3 is a message flow diagram illustrating a measurement operation on neighboring cells for cell (re)selection and handover according to a first embodiment of the present invention. Reference numeral 301 represents a UE, and reference numeral 303 represents a cell where the UE 301 is now located, or represents an eNB that controls a serving cell that is providing a service for the UE 301.

Referring to FIG. 3, in step 311, the eNB transmits system information or UE-dedicated measurement control message to the UE. The UE acquires, from the system information or UE-dedicated measurement control message, an absolute threshold Threshold_P-BCH_reading (threshold to read P-BCH of detected neighboring cells) for a radio channel status of a neighboring cell, to be applied to the measurement. In step 321, the UE acquires measurement-related parameters Qoffset through P-BCH only for the neighboring cells whose measurement result values indicating radio channel statuses given before its application of Qoffset exceeds the absolute threshold Threshold_P-BCH_reading, among the detected neighboring cells. Reference will be made herein only to the Qoffset as a representative of the measurement-related parameters transmitted through P-BCH. In step 323, the UE applies the Qoffset to measurement result values of the corresponding neighboring cells to rank the neighboring cells according to the result values, and selects a target neighboring cell for cell selection or cell reselection according to the ranking result.

Although the absolute threshold to be applied to the neighboring cells is explicitly signaled in the example shown in FIG. 3, the absolute threshold can be hard-coded to the UE as a fixed value, or can be determined by an implicit rule in an alternative embodiment. For example, the 3GPP system uses S_criteria indicating the minimum radio channel condition that the UE should satisfy to select a cell. The UE acquires measurement-related parameters through P-BCH only for the neighboring cells whose radio channel strength exceeds S_criteria, among the detected neighboring cells. For more detail of S_criteria, reference can be made to 3GPP specification 25.304.

Figure 4:
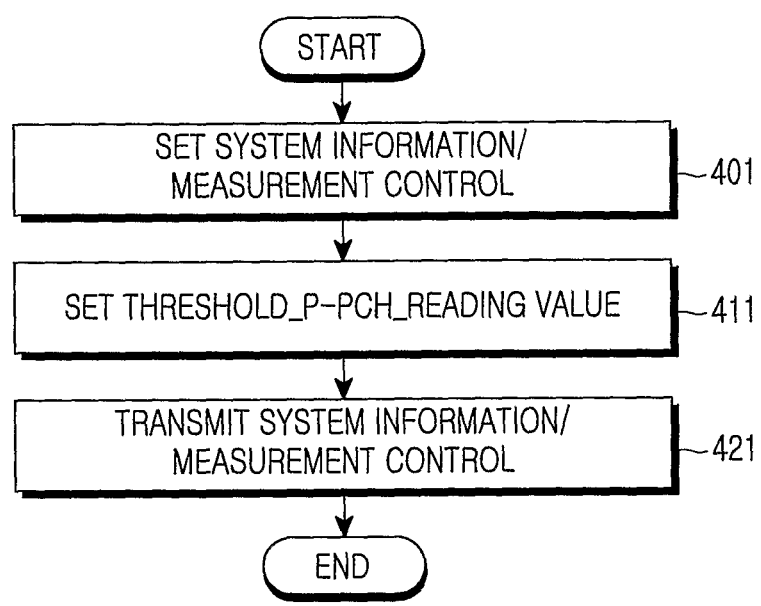
FIG. 4 is a flow diagram illustrating an operation of an eNB according to the first embodiment of the present invention.

FIG. 4 is a flow diagram illustrating an operation of an eNB according to the first embodiment of the present invention.

Referring to FIG. 4, in step 401, the eNB generates system information or a UE-dedicated measurement control message. In step 411, the eNB sets an absolute threshold Threshold_P-BCH_reading. In step 421, the eNB transmits the absolute threshold Threshold_P-BCH_reading to the UE on the system information or UE-dedicated measurement control message.

Figure 5:
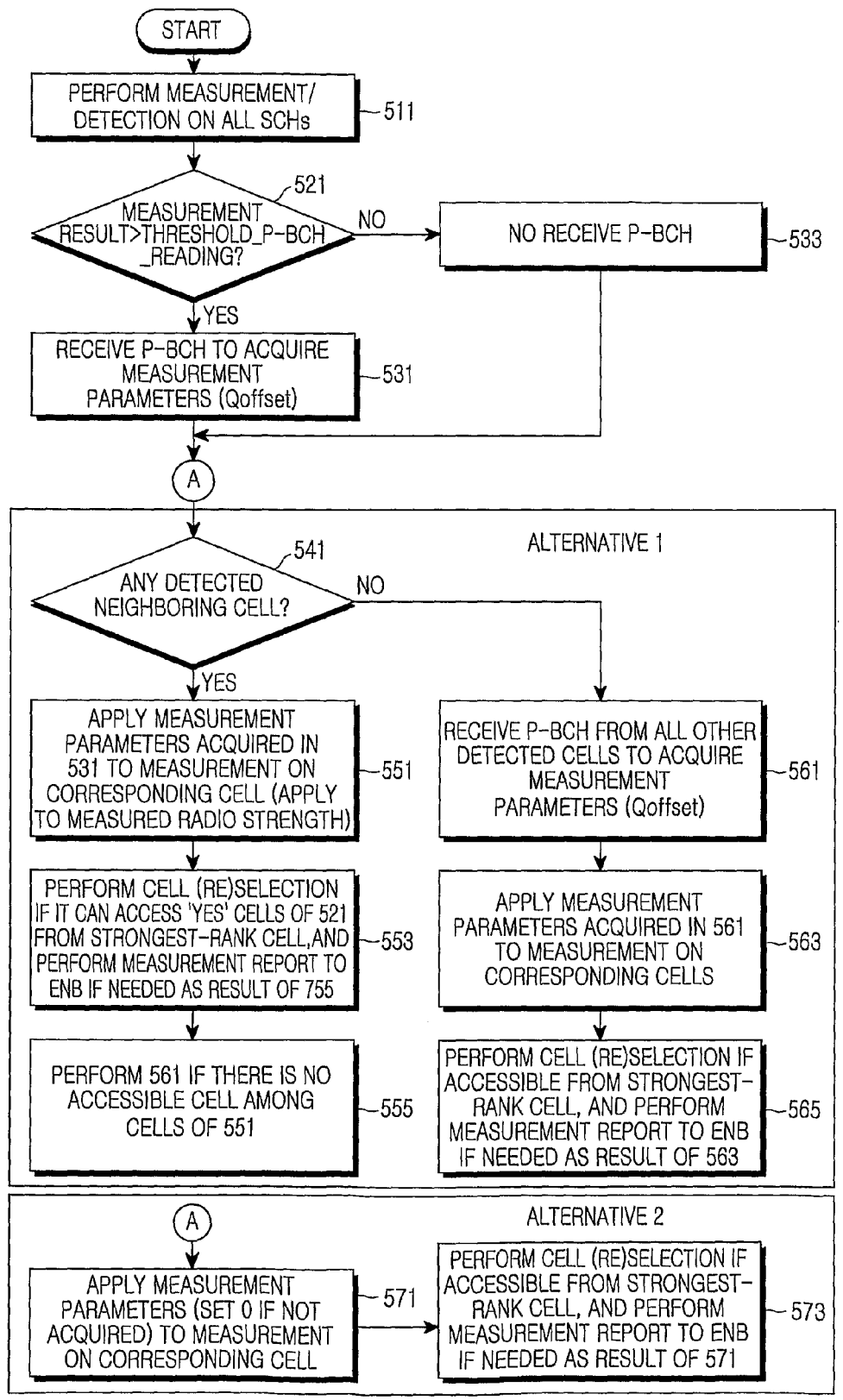
FIG. 5 is a flow diagram illustrating an operation of a UE according to the first embodiment of the present invention.

FIG. 5 is a flow diagram illustrating an operation of a UE according to the first embodiment of the present invention.

Referring to FIG. 5, in step 511, the UE performs measurement/detection on all SCH signals used for cell identification. That is, the UE detects whether there are any cells in its vicinity. In step 521, for all detected neighboring cells, the UE determines whether their measurement result values indicating radio channel statuses measured before its application of Qoffset exceeds an absolute threshold Threshold_P-BCH_reading. If measurement result values of detected first neighboring cells exceed the absolute threshold, the UE proceeds to step 531 where it receives measurement-related parameters Qoffset through P-BCH from the first neighboring cells. However, if measurement result values of detected second neighboring cells do not exceed the absolute threshold, the UE proceeds to step 533 where it receives no P-BCH signal from the second neighboring cells. Therefore, the measurement-related parameters of the second neighboring cells are not applied to the measurement result values of the second neighboring cells. After performing steps 521, 531 and 533 for all detected neighboring cells, the UE performs steps 541-565 or steps 571-573 according to the standard or the choice of the system designer.

In step 541, the UE compares measurement result values-before-Qoffset application (i.e., raw measurement result values) for the detected neighboring cells with the absolute threshold, to check whether there is at least one first neighboring cell having a measurement result value exceeding the absolute threshold. The term 'raw measurement result value' as used herein refers to a measurement result value given before the Qoffset obtained through P-BCH of the neighboring cells is applied thereto. If there is no first neighboring cell having a measurement result value exceeding the absolute threshold, the UE proceeds to step 561 where it receives measurement-related parameters Qoffset through P-BCH for all detected neighboring cells. In step 563, the UE applies the Qoffset to the measurement on the corresponding neighboring cells to rank the neighboring cells. In step 565, the UE operates according to the measurement result of step 563. That is, in the RRC idle mode, the LTE performs cell (re)selection if it can access cells beginning from the highest-rank cell, and in the RRC connected mode, the UE transmits a measurement report to the eNB if necessary. The measurement report, which is used for notifying the eNB of the measurement result values for the current cell or neighboring cells, can include raw measurement result values of radio channels, or measurement result values to which Qoffset is applied. The term 'raw measurement result value' as used herein means a measurement result value to which no Qoffset is applied.

However, if there are first neighboring cells having a measurement result value exceeding the absolute threshold, the UE proceeds to step 551 where it applies the measurement-related parameters acquired in step 531 to the measurement on the first neighboring cells, to rank the first neighboring cells. In step 553, the UE operates according to the measurement results obtained by applying the measurement-related parameters to the first neighboring cells. That is, in the RRC idle mode, the UE performs cell (re)selection if it can access cells beginning from the highest-rank cell, and in the RRC connected mode, the UE transmits a measurement report to the eNB if necessary. In the ranking process of steps 553 and 565, the cell having a greater measurement result value to which Qoffset is applied, is assigned a higher rank. In step 555, the UE proceeds to step 561 if there is no accessible cell in step 553.

Steps 571-573 correspond to an alternative embodiment that the UE can perform instead of steps 541-565. In step 571, the UE applies the measurement-related parameters to the measurement on the detected neighboring cells. If the UE has not acquired the Qoffset as the measurement result values of the detected neighboring cells are restricted by the absolute threshold Threshold_P-BCH_reading, the UE sets Qoffset of the corresponding neighboring cells (i.e., second neighboring cells) to a zero (0) value, and applies it to the measurement result values of the second neighboring cells. In step 573, the UE operates according to the measurement result of step 571. That is, in the RRC idle mode, the UE performs cell (re) selection if it can access cells beginning from the highest-rank cell in order of the greater measurement result value, and in the RRC connected mode, the UE transmits a measurement report to the eNB if necessary.

Second Embodiment

Figure 6:
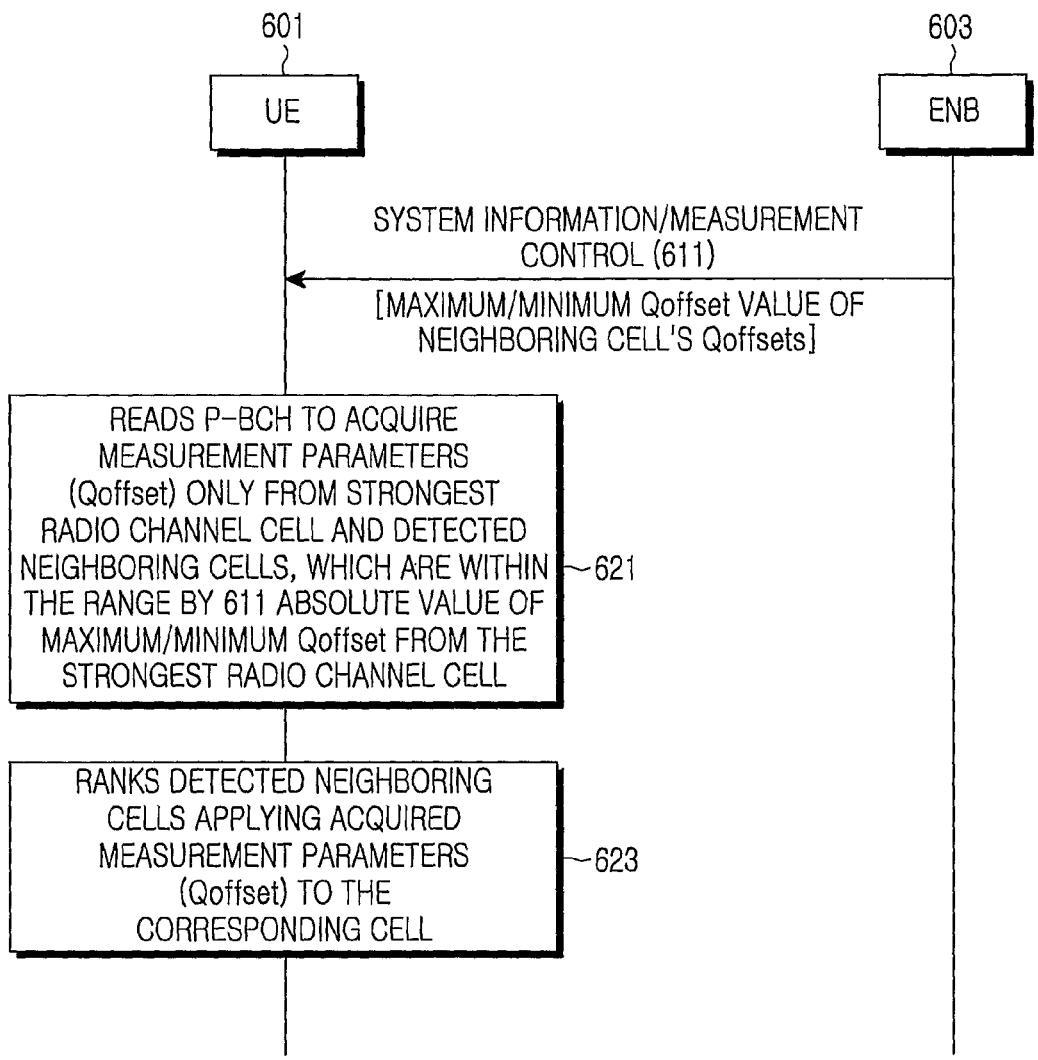
FIG. 6 is a message flow diagram illustrating a measurement operation on neighboring cells for cell (re)selection and handover according to a second embodiment of the present invention.

FIG. 6 is a message flow diagram illustrating a measurement operation on neighboring cells for cell (re)selection and handover according to a second embodiment of the present invention. Reference numeral 601 denotes a UE, and reference numeral 603 indicates a cell where the UE 601 is now located, or represents an eNB that controls a serving cell that is providing a service for the UE 601.

Referring to FIG. 6, in step 611, the eNB transmits system information or a UE-dedicated measurement control message to the UE. Based on the system information or UE-dedicated measurement control message, the UE acquires a relative threshold for radio channel statuses of neighboring cells that it will apply to the measurement. The term 'relative threshold' as used herein refers to a threshold relative to that of a neighboring cell having the maximum measurement result value, and the term 'maximum measurement result value' as used herein means a measurement result value before application of Qoffset, i.e., a raw measurement result value. However, the measurement result values to be compared can be a measurement result value before Qoffset of the corresponding neighboring cell is applied thereto, or a measurement result value-after-Qoffset application. For example, these are used herein in comparing them with measurement result values of other neighboring cells depending on Qoffset of the neighboring cell having the best measurement result value before Qoffset is applied thereto. That is, in the system information or UE-dedicated measurement control message, the maximum or minimum Qoffset among the Qoffsets of the neighboring cells is included as the relative threshold. In this case, the maximum Qoffset or the minimum Qoffset can be included according to how Qoffset is applied to the measurement.

Case 1) measurement result-before-Qoffset application+ Qoffset

Case 2) measurement result-before-Qoffset application− Qoffset

If the UE applies Qoffset to the measurement as in Case 1), the maximum Qoffset among the Qoffsets of neighboring cells is transmitted in step 611. However, if the UE applies Qoffset to the measurement as in Case 2), the minimum Qoffset among the Qoffsets of neighboring cells is transmitted in step 611.

In step 621, the UE receives P-BCH signals to acquire Qoffset only for a first cell having the maximum measurement result value-before-Qoffset application, i.e., the maximum raw measurement result value, and second neighboring cells having a measurement result value-before-Qoffset application within an absolute range of the maximum/minimum Qoffset received from the first cell. In this case, the measurement result value-before-Qoffset application or the measurement result value-after-Qoffset application can be used as the measurement result value of the cell having the best radio channel status to which an absolute value of the maximum/minimum Qoffset is applied.

For example, let's assume that the maximum/minimum Qoffset received from the eNB of the neighboring cells detected by the UE and the serving cell is as follows:

cellA: measurement result value, 3 dB, for radio channel status-before-Qoffset application cellB: measurement result value, 2 dB, for radio channel status-before-Qoffset application cellC: measurement result value, 1.5 dB, for radio channel status-before-Qoffset application cellD: measurement result value, 0.5 dB, for radio channel status-before-Qoffset application cellE: measurement result value, −1 dB, for radio channel status-before-Qoffset application maximum/minimum Qoffset: −2 dB Since cellA has the maximum raw measurement result value, and cellB and cellC exist within an absolute range, 2 dB, between the maximum/minimum Qoffset, the UE acquires Qoffset of corresponding cells through P-BCH and applies them to the measurement on the corresponding cells, only for the cellA, cellB and cellC.

In an alternative embodiment, the UE preferentially acquires Qoffset and applies it to the measurement of cellA only for the cellA having the maximum raw measurement result value, and then acquires Qoffset of each cell through P-BCH and applies it to the measurement on the corresponding cell, only for the neighboring cells having the measurement result values within an absolute range between the maximum/minimum Qoffset for the measurement result-after-Qoffset application of cellA.

For example, if Qoffset of cellA is −1.5 dB, a measurement result-after-Qoffset application of cellA obtained by applying it to the raw measurement result value of cellA according to Case 2) is 4.5 dB. Since there are no other neighboring cells having the measurement result value existing within an absolute range of 6.5 dB (=4.5 dB+2 dB)~2.5 dB (=4.5 dB−2 dB) between the maximum/minimum Qoffset on the basis of 4.5 dB, the UE receives Qoffset through only from the cellA. For convenience of the calculation, the range can be 4.5 dB~2.5 dB. This is because the maximum measurement result value is 4.5 dB.

If the cell having the maximum measurement result value-after-Qoffset application is inaccessible for cell (re)selection in the above-stated two methods, the UE re-performs the above procedure on the cell having the second-best radio channel status. In this case, the UE can reuse the previously acquired Qoffset for the cells from which it has already acquired Qoffset, and thus has no need to re-receive P-BCH signals. The second method will be described herein by way of example.

In step 623, the UE applies the Qoffset received through P-BCH to the measurement on the corresponding neighboring cell, and ranks the detected neighboring cells.

Figure 7:
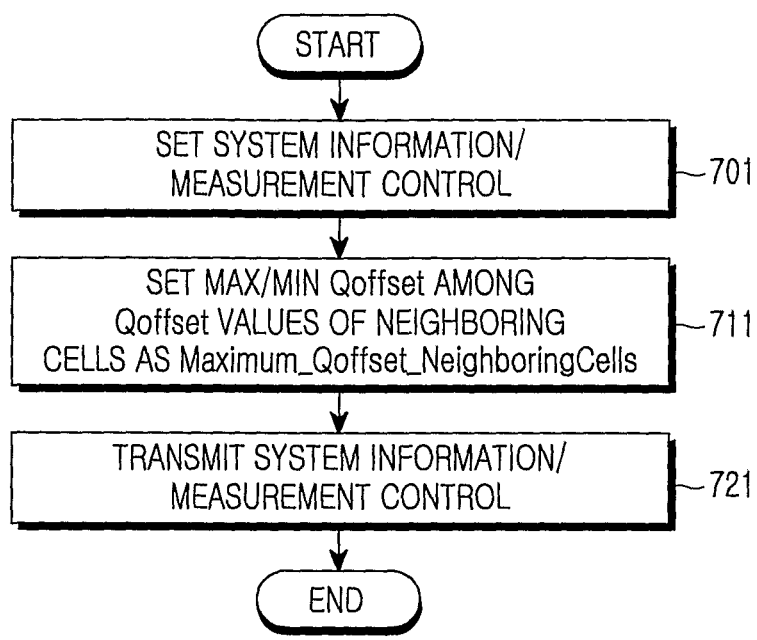
FIG. 7 is a flow diagram illustrating an operation of an eNB according to the second embodiment of the present invention.

FIG. 7 is a flow diagram illustrating an operation of an eNB according to the second embodiment of the present invention.

Referring to FIG. 7, in step 701, the eNB generates system information or a UE-dedicated measurement control message. In step 711, the eNB sets the maximum/minimum Qoffset among the Qoffsets of neighboring cells as relative threshold Maximum_Qoffset_NeighboringCells in the system information or UE-dedicated measurement control message. In this case, the maximum Qoffset or the minimum Qoffset is set as Maximum_Qoffset_NeighboringCells according to how Qoffset is applied to the measurement.

Case 1) (raw) measurement result-before-Qoffset application+Qoffset

Case 2) (raw) measurement result-before-Qoffset application−Qoffset

If Qoffset is applied to the measurement as in Case 1), the maximum Qoffset among Qoffsets of the neighboring cells is set as Maximum_Qoffset_NeighboringCells. However, if Qoffset is applied to the measurement as in Case 2), the minimum Qoffset among Qoffsets of the neighboring cells is set as Maximum_Qoffset_NeighboringCells. In step 721, the eNB transmits the Maximum_Qoffset_NeighboringCells to the UE on the system information or UE-dedicated measurement control message.

Figure 8:
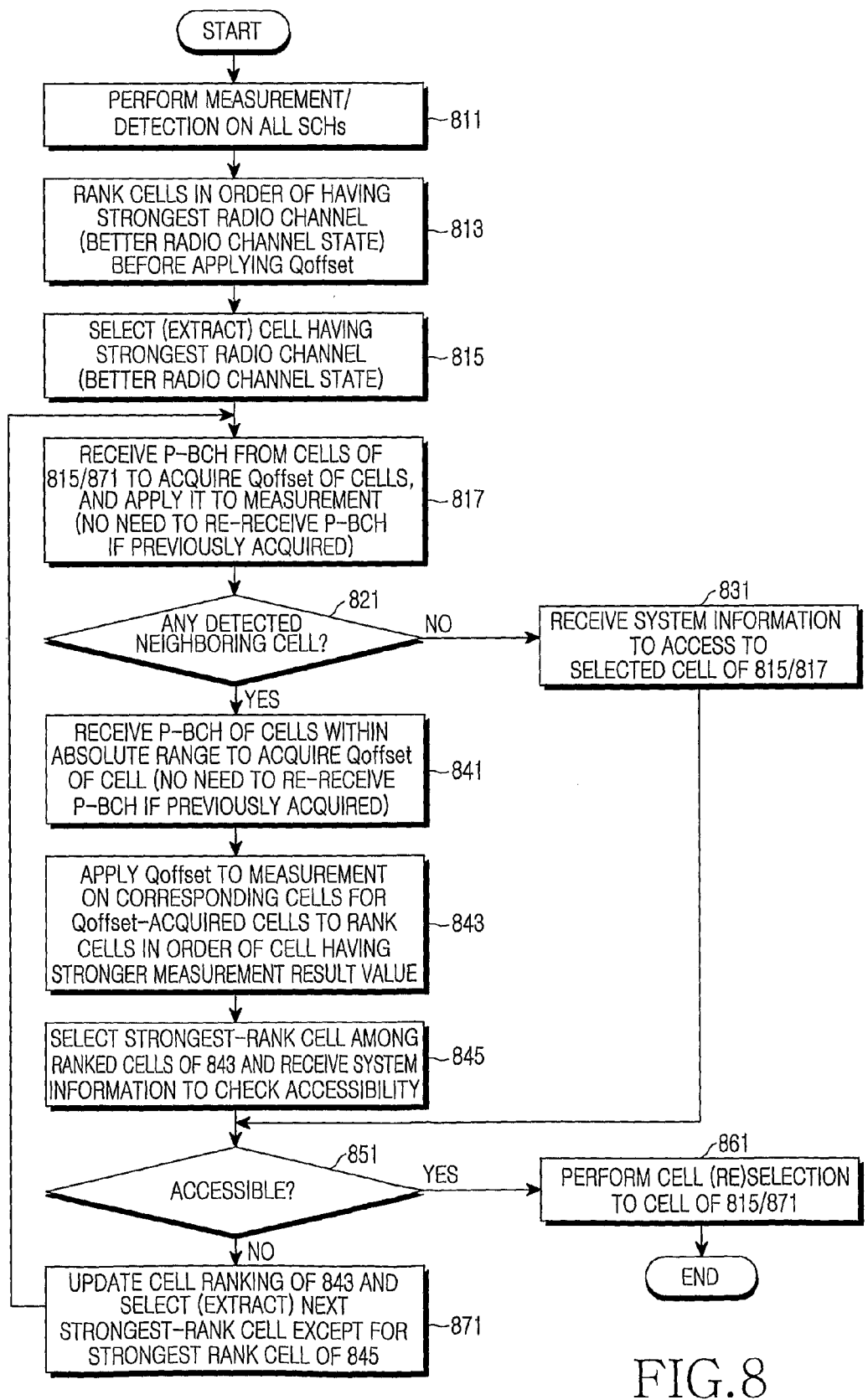
FIG. 8 is a flow diagram illustrating an operation of an RRC idle mode UE according to the second embodiment of the present invention.

FIG. 8 is a flow diagram illustrating an operation of an RRC idle mode UE according to the second embodiment of the present invention. In the RRC idle mode, the UE moves between cells according to the measurement result without commands from the network.

Referring to FIG. 8, in step 811, the UE performs measurement/detection on all SCH signals used for cell identification. That is, the UE detects whether there are any cells in its vicinity. In step 813, the UE ranks neighboring cells in order of the cell having a better radio channel status according to the measurement result value-before-Qoffset application (i.e., raw measurement result value) of the detected cells. In step 815, the UE selects the highest-rank cell. That is, the UE selects a first cell having the best radio channel status among the detected cells according to the measurement result values-before-Qoffset application.

In step 817, the UE receives a P-BCH signal from the first cell selected in step 815 or 871, to acquire Qoffset of the first cell, and applies it to the measurement. In this case, if the UE has already acquired Qoffset for the first cell, it can reuse the previously acquired Qoffset without the need to re-receive the P-BCH signal. In step 821, the UE checks whether there is any detected second cell having the measurement result value within a predetermined range based on the absolute value of Maximum_Qoffset_NeighboringCells from the measurement result value of the first cell in a list of the cells ranked in step 813 or 871. In this case, the absolute value of Maximum_Qoffset_NeighboringCells is applied to the measurement result value-after-Qoffset application of the first cell. For example, if the measurement result value-after-Qoffset application of the first cell is 3 dB and Maximum_Qoffset_NeighboringCells is 2 dB, the UE checks in step 821 whether there are any second cells having a measurement result value above 3 dB−[2 dB]=1 dB. The measurement result values of other cells being compared with the first cell are (raw) measurement result values-before-Qoffset application. That is, in this example, the UE checks whether there are any second cells whose measurement result value-before-Qoffset application is greater than or equal to 1 dB.

If there are the second cells, the UE proceeds to step 841 where it acquires Qoffset of each cell through P-BCH from the second cells within a predetermined range based on the Maximum_Qoffset_NeighboringCells absolute value, including the first cell. If the UE has already acquired Qoffset of a certain cell, it can reuse the previously acquired Qoffset without the need to re-receive the P-BCH signal. In step 843, the UE applies the Qoffset to the measurement on the first and second cells from which it has acquired Qoffset, and ranks the cells in order of the cell having the greater measurement result value.

In step 845, the UE selects a third cell having the highest rank among the cells ranked in step 843, and receives system information from the third cell to determine whether it can access the third cell. In step 851, the UE checks if it can access the third cell depending on the system information of the third cell. If it can access the third cell, the UE proceeds to step 861 where it performs cell (re)selection to the third cell. Herein, the first cell is a cell having the maximum measurement result value-before-Qoffset application, the second cell is a cell having the measurement result value within a predetermined range based on that of the first cell, and the third cell is a cell having the best channel status according to the measurement result value-after-Qoffset application. Therefore, the UE perform cell reselection to the third cell. However, if it cannot access the third cell, the UE proceeds to step 871 where it updates the cell list by removing the third cell having the highest rank from the cell list that underwent the cell ranking process of step 845, and selects the highest-rank cell from the updated cell list, and then returns to step 817.

On the other hand, if there are no second cells in step 821, the UE proceeds to step 831 where it receives system information from the first cell to check whether it can access the first cell, and then proceeds to step 851.

Figure 9:
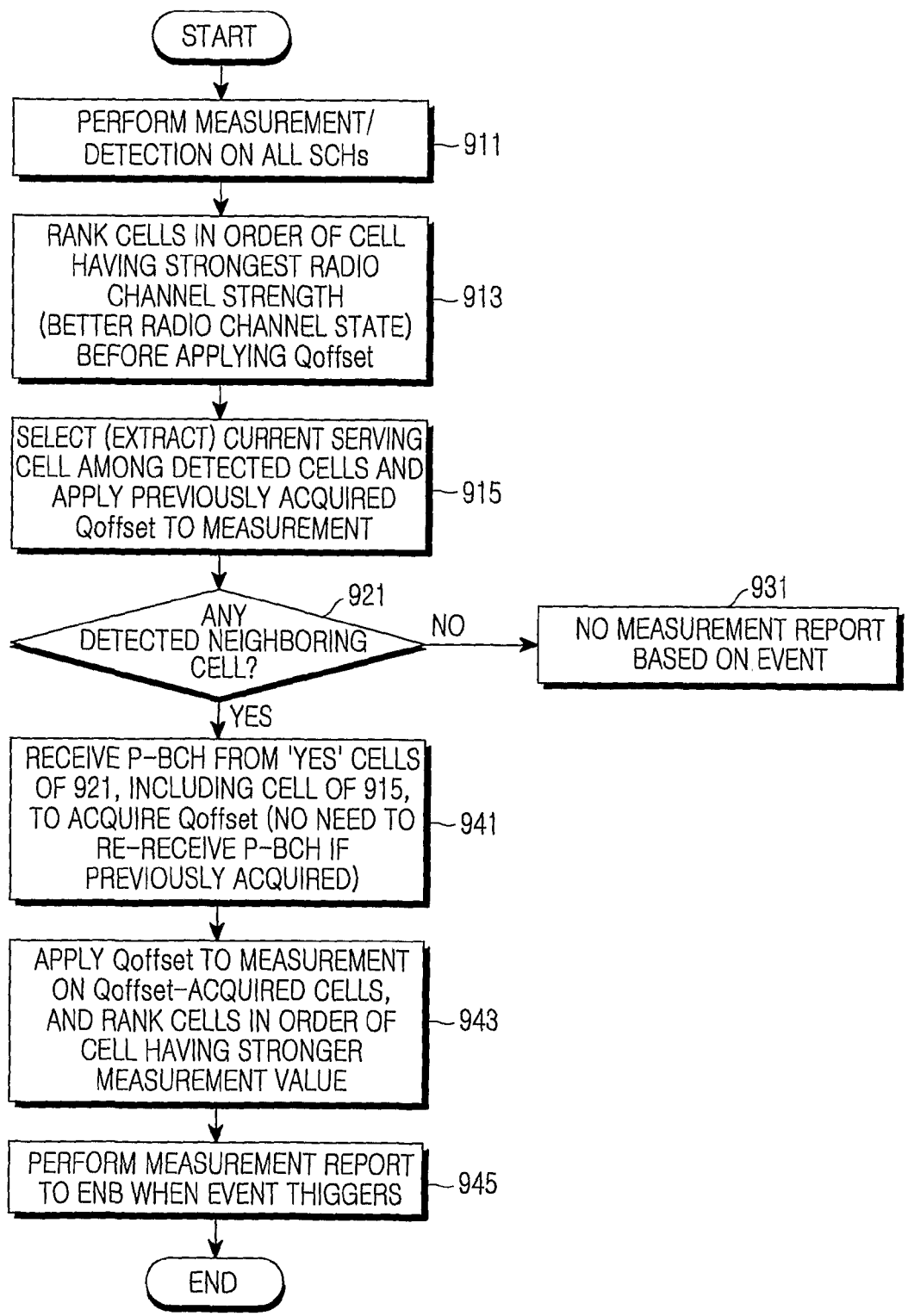
FIG. 9 is a flow diagram illustrating an operation of an RRC connected mode UE according to the second embodiment of the present invention.

FIG. 9 is a flow diagram illustrating an operation of an RRC connected mode UE according to the second embodiment of the present invention.

Referring to FIG. 9, in step 911, the UE performs measurement/detection on all SCH signals used for cell identification. That is, the UE detects whether there are any cells in its vicinity. In step 913, the UE ranks the detected cells in order of the cell having the better radio channel status according to the measurement result values-before-Qoffset application (i.e., raw measurement result values) of the detected cells. In step 915, the UE selects the serving cell with which it is now in communication, from among the detected cells, and applies Qoffset of the serving cell to the measurement on the serving cell. In step 921, the UE applies Maximum_Qoffset_NeighboringCells to the measurement result values of the ranked cells, and then checks if there are any first neighboring cells having the measurement result value within a range based on a measurement report threshold against the measurement result value of the serving cell. The measurement report threshold serves as a criterion capable of triggering a measurement report, and the measurement report is triggered, for example, when a new cell having a measurement result value within a range based on the measurement report threshold against the measurement result value of the serving cell is detected, or when the old cell having the measurement result value within the range is removed.

If it is checked step 921 that there are first neighboring cells, the UE proceeds to step 941 where it receives P-BCH signals from the first neighboring cells, including the serving cell, to acquire Qoffset. In this case, the UE can reuse the previously acquired Qoffset without re-receiving the P-BCH signals, for the neighboring cells from which it has already acquired Qoffset. In step 943, the UE applies the Qoffset acquired from the serving cell and the first neighboring cells to the measurement on the corresponding cells, and then ranks the cells in order of the cell having the greater measurement result value. In step 945, if the measurement report on the measurement result of step 943 is triggered, the UE transmits a measurement report to the eNB. However, if it is checked in step 921 that there are no first neighboring cells, the UE proceeds to step 931 where it does not perform an event-based measurement report. The term 'event-based measurement report' as used herein refers to a measurement report for notifying the eNB of occurrence of, for example, a situation where a new neighboring cell having a measurement result value within a range of a measurement report threshold against the serving cell measurement result value is detected, and/or a situation where the old cell having the measurement result value within the range is removed.

Apparatus

Figure 10:
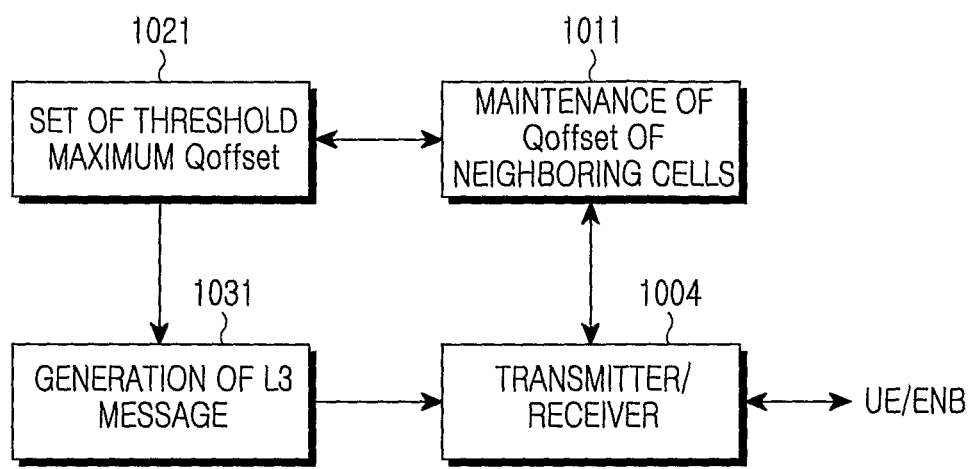
FIG. 10 is a block diagram illustrating a structure of an eNB apparatus according to a preferred embodiment of the present invention.

FIG. 10 is a block diagram illustrating a structure of an eNB apparatus according to a preferred embodiment of the present invention.

Referring to FIG. 10, reference numeral 1001 denotes a transceiver for communication with a UE or another eNB. In the transceiver 1001, a transmission/reception unit with the UE and a transmission/reception unit with the eNB are substantially divided into different physical entities. A neighboring cell maintenance unit 1011 maintains Qoffsets for neighboring cells, which are calculated through communication between neighboring eNBs by means of the transceiver 1001. A threshold setting unit 1021 sets an absolute threshold to be transmitted to the UE, and/or the maximum/minimum Qoffset among the Qoffsets of neighboring cells, based on the Qoffsets provided from the neighboring cell maintenance unit 1011. Setting the absolute threshold corresponds to the embodiment of FIGS. 3 to 5, and setting the maximum/minimum Qoffset of the neighboring cells corresponds to the embodiment of FIGS. 6 to 9. The absolute threshold and the maximum/minimum Qoffset set by the threshold setting unit 1021 are transmitted to the UE via the transceiver 1001 over the system information or UE-dedicated measurement control message by means of an L3 message generation unit 1031.

Figure 11:
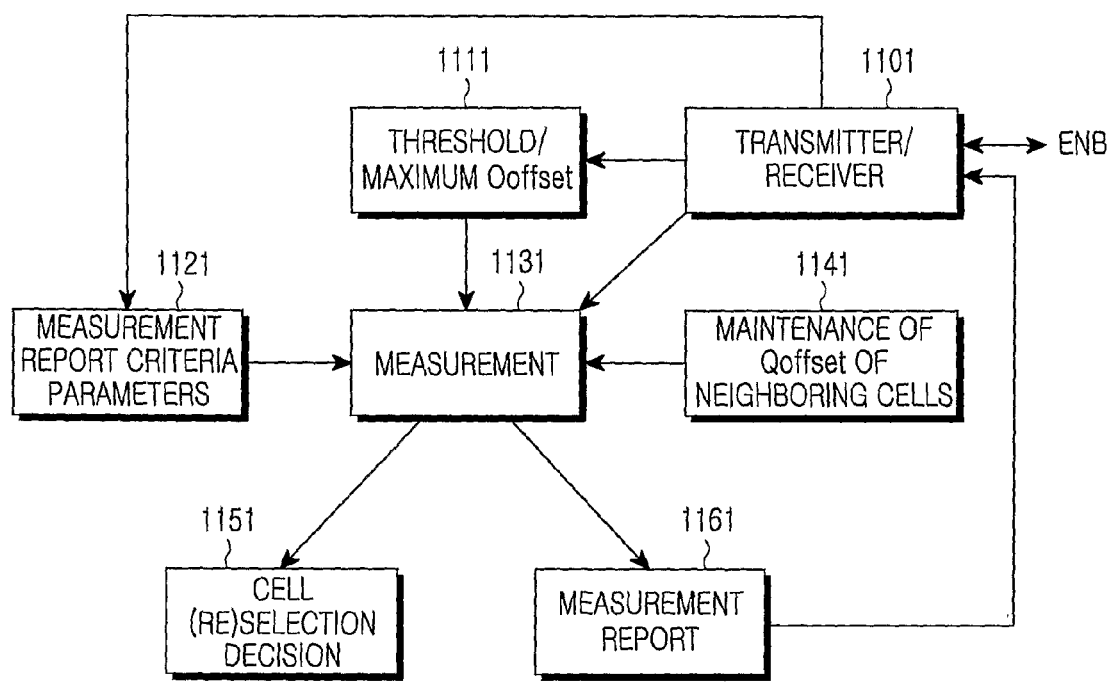
FIG. 11 is a block diagram illustrating a structure of a UE apparatus according to a preferred embodiment of the present invention.

FIG. 11 is a block diagram illustrating a structure of a UE apparatus according to a preferred embodiment of the present invention.

Referring to FIG. 11, reference numeral 1101 represents a transceiver for communication with an eNB. A threshold manager 1111 extracts an absolute threshold or the maximum/minimum Qoffset of the neighboring cells from the system information or UE-dedicated measurement control message that the transceiver 1101 has received from the eNB, and a neighboring cell maintenance unit 1141 extracts measurement-related parameters, particularly Qoffset, of neighboring cells from the P-BCH signals that the transceiver 1101 has received from eNBs of the neighboring cells. A report criteria parameter manager 1121 receives parameter information such as the measurement report threshold of the RRC connected mode UE by means of the transceiver 1101.

A measurement unit 1131 generates measurement result values by performing measurement on the serving cell and neighboring cells depending on parameter information such as the Qoffsets of neighboring cells and the measurement report threshold of the RRC connected mode UE according to one of the above-stated embodiments, and the measurement result values are used for determining cell (re)selection in a cell selection decision unit 1151, or used for performing a measurement report in a measurement report unit 1161.

As is apparent from the foregoing description, the present invention can perform measurement by applying measurement-related parameters only for the neighboring cells whose radio strength exceeds a particular absolute threshold, decreasing the measurement delay. In addition, the present invention can perform measurement only for the neighboring cells whose measurement result values fall within a particular range even though the measurement-related parameters are applied thereto, causing an decrease in the measurement delay. Therefore, in performing measurement on the neighboring cells for cell selection or cell reselection and handover, the present invention can decrease the measurement delay without increasing the UE complexity.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing measurement on neighboring cells in a mobile communication system, the method comprising:
generating raw measurement result values by performing measurement on received signals from the neighboring cells;
receiving measurement-related parameters to be applied to raw measurement result values of first neighboring cells, from the first neighboring cells having raw measurement result values exceeding an absolute threshold signaled from a base station as a result of the measurement, among the neighboring cells;
generating final measurement result values by applying the measurement-related parameters to the raw measurement result values of the first neighboring cells; and
performing cell selection or cell reselection to one of the first neighboring cells according to the final measurement result values, or transmitting a measurement report to a base station of a serving cell.

2. The method of claim 1, further comprising:
generating the final measurement result values by applying, as the measurement-related parameters, zero (0) to raw measurement result values of second neighboring cells, without receiving the measurement-related parameters from the second neighboring cells having raw measurement result values not exceeding an absolute threshold signaled from the base station as the result of the measurement, among the neighboring cells.

3. The method of claim 2, further comprising:
performing cell selection or cell reselection to one of the first and second neighboring cells according to the final measurement result values, or transmitting a measurement report to the base station of the serving cell.

4. The method of claim 1, wherein the absolute threshold is signaled from the base station of the serving cell through system information or a terminal-dedicated measurement control message.

5. The method of claim 1, further comprising: receiving measurement-related parameters to be applied to raw measurement result values of the first neighboring cells and second neighboring cells, from the first neighboring cell having the maximum raw measurement result value among the neighboring cells and from the second neighboring cells having raw measurement result values within a predetermined range from the raw measurement result value of the first neighboring cell.

6. The method of claim 5, further comprising:
generating final measurement result values by applying the measurement-related parameters to the raw measurement result values of the first and second neighboring cells.

7. The method of claim 6, further comprising:
performing cell selection or cell reselection to one of the first and second neighboring cells according to the final measurement result values, or transmitting the measurement report to the base station of the serving cell.

8. The method of claim 5, wherein the predetermined range spans between a value obtained by adding an offset value signaled from the base station to the raw measurement result value of the first neighboring cell and a value obtained by subtracting the offset value from the raw measurement result value.

9. The method of claim 8, wherein the offset value is one of the maximum and minimum offset values among offset values of the neighboring cells, included in the measurement-related parameters.

10. An apparatus for performing measurement on neighboring cells in a mobile communication system, the apparatus comprising:
a neighboring cell maintenance unit for generating raw measurement result values by performing measurement on received signals from the neighboring cells;
a threshold manager for receiving measurement-related parameters to be applied to raw measurement result values of first neighboring cells, from the first neighboring cells having raw measurement result values exceeding an absolute threshold signaled from a base station as a result of the measurement, among the neighboring cells;
a measurement unit for generating final measurement result values by applying the measurement-related parameters to the raw measurement result values of the first neighboring cells;
a cell selection decision unit for performing cell selection or cell reselection to one of the first neighboring cells according to the final measurement result values; and
a measurement report unit for transmitting a measurement report to a base station of a serving cell.

11. The apparatus of claim 10, wherein the measurement unit generates the final measurement result values by applying, as the measurement-related parameters, zero (0) to raw measurement result values of second neighboring cells, without receiving the measurement-related parameters from the second neighboring cells having raw measurement result values not exceeding the absolute threshold signaled from the base station as the result of the measurement, among the neighboring cells.

12. The apparatus of claim 11, wherein the cell selection decision unit performs cell selection or cell reselection to one of the first and second neighboring cells according to the final measurement result values, or the measurement report unit transmits the measurement report to the base station of the serving cell.

13. The apparatus of claim 10, further comprising:
a transceiver for receiving the absolute threshold signaled from the base station of the serving cell through system information or a terminal-dedicated measurement control message.

14. The apparatus of claim 10, wherein the neighboring cell maintenance unit receives measurement-related parameters to be applied to raw measurement result values of the first neighboring cells and second neighboring cells, from the first neighboring cell having the maximum raw measurement result value among the neighboring cells and from the second neighboring cells having raw measurement result values within a predetermined range from the raw measurement result value of the first neighboring cell.

15. The apparatus of claim 14, wherein the measurement unit generates final measurement result values by applying the measurement-related parameters to the raw measurement result values of the first and second neighboring cells.

16. The apparatus of claim 15, wherein the cell selection decision unit performs cell selection or cell reselection to one of the first and second neighboring cells according to the final measurement result values, or the measurement report unit transmits the measurement report to the base station of the serving cell.

17. The apparatus of claim 14, wherein the predetermined range spans between a value obtained by adding an offset value signaled from the base station to the raw measurement result value of the first neighboring cell and a value obtained by subtracting the offset value from the raw measurement result value.

18. The apparatus of claim 17, wherein the neighboring cell maintenance unit uses the offset value which is one of the maximum and minimum offset values among offset values of the neighboring cells, included in the measurement-related parameters.

19. A method for managing neighboring cells in a mobile communication system, the method comprising:
managing raw measurement result values for the neighboring cells;
setting an absolute threshold or one of maximum and minimum offset values taking the raw measurement result values into consideration; and
generating a message having system information including the set absolute threshold or one of the set maximum and minimum offset values, or generating a terminal-dedicated measurement control message.

20. An apparatus for managing neighboring cells in a mobile communication system, the apparatus comprising:
a neighboring cell maintenance unit for managing raw measurement result values for the neighboring cells;
a threshold setting unit for setting an absolute threshold or one of maximum and minimum offset values taking the raw measurement result values into consideration; and
a message generation unit for generating a message having system information including the set absolute threshold or one of the set maximum and minimum offset values, or generating a terminal-dedicated measurement control message.

* * * * *